United States Patent
Billert et al.

(10) Patent No.: US 12,466,232 B2
(45) Date of Patent: Nov. 11, 2025

(54) TEMPERATURE-CONTROL SYSTEM AND METHOD FOR THE TEMPERATURE CONTROL OF AN ELECTRIFIED MOTOR VEHICLE

(71) Applicant: Bayerische Motoren Werke Aktiengesellschaft, Munich (DE)

(72) Inventors: Andreas Billert, Garching (DE); Simone Fuchs, Munich (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 141 days.

(21) Appl. No.: 18/262,684

(22) PCT Filed: Dec. 16, 2021

(86) PCT No.: PCT/EP2021/086051
§ 371 (c)(1),
(2) Date: Jul. 24, 2023

(87) PCT Pub. No.: WO2022/156968
PCT Pub. Date: Jul. 28, 2022

(65) Prior Publication Data
US 2024/0075788 A1    Mar. 7, 2024

(30) Foreign Application Priority Data
Jan. 25, 2021 (DE) .................... 10 2021 101 513.8

(51) Int. Cl.
*G06F 7/00* (2006.01)
*B60H 1/00* (2006.01)

(52) U.S. Cl.
CPC ..... *B60H 1/00392* (2013.01); *B60H 1/00278* (2013.01); *B60H 1/00499* (2019.05); *B60H 1/00778* (2013.01)

(58) Field of Classification Search
CPC ............ B60H 1/00392; B60H 1/00499; B60H 1/00278; B60H 1/00778
(Continued)

(56) References Cited

U.S. PATENT DOCUMENTS 10,220,671 B2    3/2019    Gee et al.
10,953,726 B2    3/2021    Carlson et al.
(Continued)

FOREIGN PATENT DOCUMENTS

CN    102887045 A    1/2013
CN    105904975 A    8/2016
(Continued)

OTHER PUBLICATIONS

PCT/EP2021/086051, International Search Report dated May 2, 2022 (Two (2) pages).
(Continued)

*Primary Examiner* — Davis D Hwu
(74) *Attorney, Agent, or Firm* — Crowell & Moring LLP

(57) ABSTRACT

An air-conditioning system for an electrified motor vehicle with an interior and a high-voltage accumulator, includes an air-conditioning installation and an electronic control unit. The air-conditioning installation air-conditions both the interior and the high-voltage accumulator. The control unit implements a preconditioning mode during charging of the parked vehicle before a journey begins in such a way that: (a) at least the length of the route and the outside temperature over the length of the route can be predicted, and (b) in that, depending on the prediction, the high-voltage accumulator can be used as: (i) a heat accumulator, when the predicted outside temperature over the length of the route is lower than the heating threshold target temperature required by the high-voltage accumulator, or (ii) a cold accumulator, when the predicted outside temperature over the length of (Continued)

the route is greater than the heating threshold target temperature required by the high-voltage accumulator.

9 Claims, 5 Drawing Sheets

(58) Field of Classification Search
USPC .......................................................... 701/36
See application file for complete search history.

(56) References Cited

U.S. PATENT DOCUMENTS

| | | |
|---|---|---|
| 2013/0020864 A1 | 1/2013 | Smajlovic et al. |
| 2017/0008375 A1 | 1/2017 | Blatchley et al. |
| 2020/0247211 A1 | 8/2020 | Devendran et al. |

FOREIGN PATENT DOCUMENTS

| | | |
|---|---|---|
| CN | 111516454 A | 8/2020 |
| DE | 10 2011 086 569 A1 | 5/2013 |
| DE | 10 2012 223 054 A1 | 6/2013 |
| DE | 10 2014 226 514 A1 | 6/2016 |
| DE | 10 2016 102 821 A1 | 8/2016 |
| DE | 10 2018 206 636 A1 | 10/2019 |
| DE | 10 2020 107 352 A1 | 10/2020 |
| WO | WO2016096612 A1 * | 6/2016 |
| WO | WO 2019/238389 A1 | 12/2019 |

OTHER PUBLICATIONS

German Search Report issued in German application No. 10 2021 101 513.8 dated Nov. 23, 2021, with Statement of Relevancy (Ten (10) pages).

Chinese-language Office Action issued in Chinese Application No. 202180071241.3 dated Aug. 12, 2025 with English translation (22 pages).

* cited by examiner

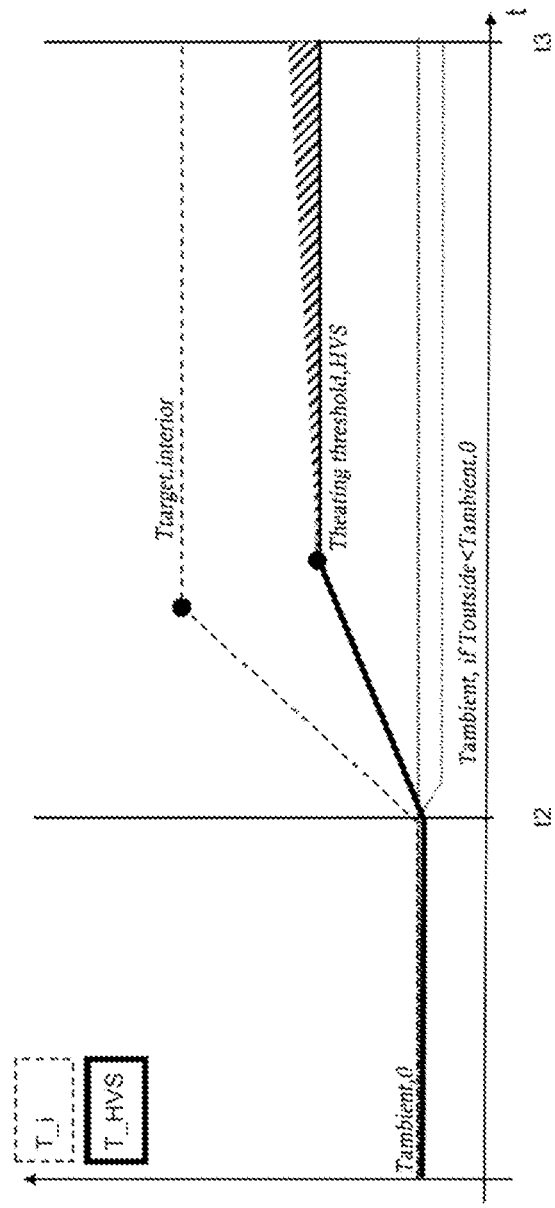
Fig. 4 (Prior art, without preconditioning)

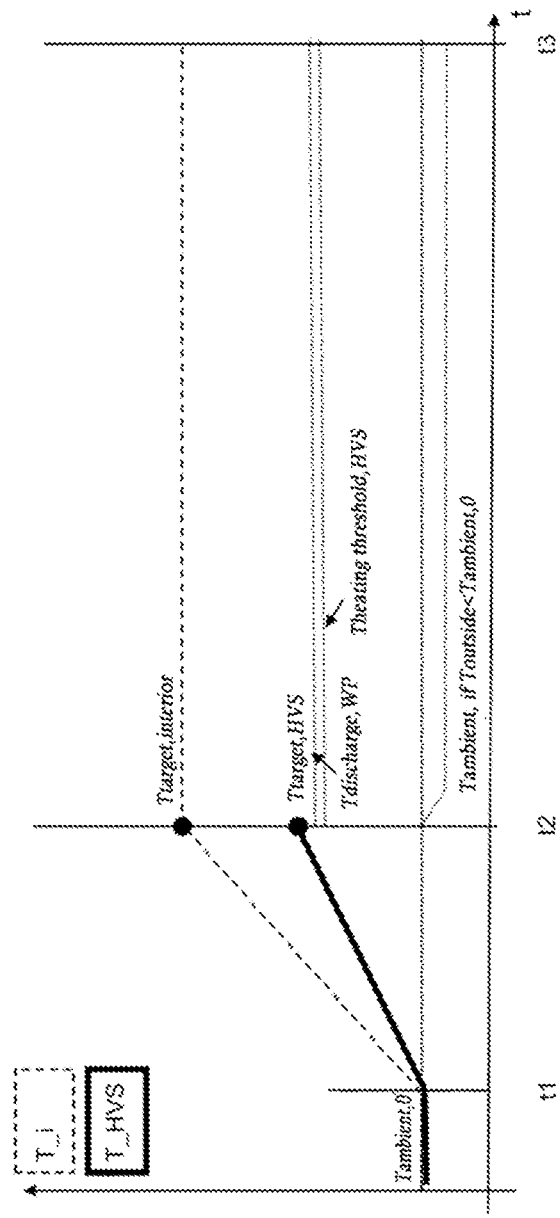
Fig. 5 (Prior art, known preconditioning)

TEMPERATURE-CONTROL SYSTEM AND METHOD FOR THE TEMPERATURE CONTROL OF AN ELECTRIFIED MOTOR VEHICLE

BACKGROUND AND SUMMARY OF THE INVENTION

The invention relates to an air-conditioning system and to a method for air-conditioning an electrified motor vehicle (electric or hybrid vehicle) which has an interior and a high-voltage accumulator.

An air-conditioning system of this kind and a method of this kind are described, for example, in DE 10 2014 226 514 A1.

In order to drive an electric or hybrid vehicle, the electric or hybrid vehicle comprises a drive train having an energy accumulator for supplying power. This energy accumulator is typically a correspondingly suitably dimensioned high-voltage battery, also called a high-voltage accumulator below. The high-voltage accumulator usually heats up during charging or discharging processes, there being a risk of an, in particular, permanent degradation of power or a reduction in the service life of the high-voltage accumulator in the event of excessive heating. Therefore, the high-voltage accumulator is usually correspondingly cooled during operation and for this purpose is often connected to an air-conditioning circuit of the vehicle which is also used to air-condition the interior. This air-conditioning circuit has a specific power, that is to say a specific maximum cooling potential which can be used to cool the interior and the high-voltage accumulator. Depending on the cooling requirement of the two components, there may be a conflict here in that the cooling potential is insufficient to meet the cooling requirement at the high-voltage accumulator and in the interior. Depending on the prioritization of the distribution of the cooling potential, either increased thermal loading on the high-voltage accumulator or losses in comfort in the interior can be expected in this case.

In order to reduce the energy consumption for air-conditioning the interior and to obtain an increased range of the vehicle owing to reduced drawing of energy from the high-voltage accumulator in an electric or hybrid vehicle, a device for air-conditioning a passenger compartment and an energy accumulator for exchanging a cooling medium are thermally coupled to one another according to the prior art. In this way, it is possible to first of all exchange heat between these two components in certain situations instead of activating the device for air-conditioning. For example, thermal energy, in particular waste heat, from the energy accumulator is taken up and passed to the device for air-conditioning the passenger compartment. This is done for as long as an actual temperature of the passenger compartment lies within a specified temperature range. In this way, the energy accumulator is cooled without having to activate the device for air-conditioning. The dissipated heat is passed to the passenger compartment, but only for as long as the temperature of the passenger compartment lies in the specified temperature range.

In the above-mentioned, an electric or hybrid vehicle has an interior and a high-voltage accumulator, both of which can be air-conditioned by means of an air-conditioning installation of the vehicle, the air-conditioning installation having a specific cooling potential. Here, the high-voltage accumulator (HVS) has a current high-voltage accumulator temperature and the interior has a current interior temperature. In a preconditioning mode, the high-voltage accumulator is supercooled to a high-voltage accumulator temperature below a high-voltage accumulator operating temperature by means of the air-conditioning installation, for the purpose of preconditioning the high-voltage accumulator.

As a result, the high-voltage accumulator is cooled by means of the air-conditioning installation, even though there is currently no cooling requirement with respect to the high-voltage accumulator and the current high-voltage accumulator temperature assumes a value below the high-voltage accumulator operating temperature. Therefore, the high-voltage accumulator is advantageously supercooled to below its high-voltage accumulator operating temperature. Owing to this so-called preconditioning, a cold buffer is then advantageously created, this delaying the time of any possible cooling requirement at the high-voltage accumulator. On account of the cold buffer, heating of the high-voltage accumulator is possible without degradation of power due to excessive heating, without the air-conditioning installation having to be used to cool the high-voltage accumulator. The air-conditioning installation is then available, in particular exclusively, for cooling the interior with full cooling potential. In this way, the high-voltage accumulator also forms a cold reservoir with respect to being air-conditioned itself. The high-voltage accumulator is already, in particular proactively, preconditioned in those phases in which no cooling or only slight cooling of the high-voltage accumulator would take place.

Outside the preconditioning mode, the high-voltage accumulator temperature is in particular regulated to the high-voltage accumulator operating temperature, which lies within a suitable high-voltage accumulator operating temperature range, in order to prevent degradation of power or damage.

Therefore, in summary, preconditioning of the high-voltage accumulator taking into consideration the high-voltage accumulator as a cold buffer for reducing the energy requirement of the air-conditioning system for the interior during the journey takes place in DE 10 2014 226 514 A1. In this case, the possibility of taking into consideration future temperatures of the interior and the high-voltage accumulator based on navigation data during supercooling is already taken into consideration.

Furthermore, WO 2019/238389 A1 discloses predicting the request for preconditioning based on usage data, such as weather and expected length of stay. The vehicle user receives a message and has to confirm the recommended preconditioning.

Finally, US 2017/0008375 A1 forms the prior art for preconditioning taking into consideration time-related threshold values.

The object of the invention is to specify a method and a device for air-conditioning an electric or hybrid vehicle, in which both losses in comfort in the interior of the vehicle and possible degradation of power of the high-voltage accumulator are further avoided or at least reduced. Other objects will be clear to those of ordinary skill in the art from the instant disclosure.

The invention relates to an air-conditioning system including a method for air-conditioning an electrified motor vehicle which has an interior and a high-voltage accumulator, comprising an air-conditioning installation and an electronic control unit, wherein the air-conditioning installation is designed to air-condition both the interior and the high-voltage accumulator and wherein the control unit has a preconditioning module for implementing a preconditioning mode during charging of the parked vehicle before a journey begins. The preconditioning module is configured in such a way that at least the length of the route and the outside temperature over the length of the route can be predicted and in that, depending on this prediction, the high-voltage accumulator can be used either as a heat accumulator, when the predicted outside temperature over the length of the route is lower than the heating threshold target temperature required by the high-voltage accumulator, or as a cold accumulator, when the predicted outside temperature over the length of the route is greater than the heating threshold target temperature required by the high-voltage accumulator. In addition, a predicted elevation profile can advantageously also be taken into consideration.

The invention is based on the following considerations:

In essence, the invention considers the high-voltage accumulator to be a heat accumulator for the high-voltage accumulator itself and the interior of the vehicle.

The preconditioning (VOKO) of the high-voltage accumulator (HVS) according to the prior art cools or heats the high-voltage accumulator to a desired temperature. In the case of heating, the desired temperature is currently at most 5° C. (AC charging) or 20° C. (DC charging). The known preconditioning does not take into consideration any use of the high-voltage accumulator as a heat accumulator or any data from the navigation (destination category, route information) or weather forecast for optimizing the overall energy consumption during the journey (and therefore the range) or for additionally optimizing the travel time.

The information about a pending route is not used by the known preconditioning in order to optimally adapt the target temperatures to the route and weather information. As a result, potential ways of optimizing the energy consumption during the journey remain unused. At very cold temperatures for example, there is additional energy consumption during the journey due to the heating of the high-voltage accumulator and the interior according to the current art. In addition, rapid-charging processes considered in the route are very limited at low temperatures of the high-voltage accumulator.

Basic Principle of the Invention

By means of predicting the outside temperature and the length of the route and using the high-voltage accumulator as a heat accumulator, the energy consumption during the journey is reduced by the preconditioning strategy (VOKO+) newly proposed according to the invention. The outside temperature and length of the route can be predicted both with and without input of the route destination with activation of the "VOKO+". "VOKO+" provides heating or cooling of the high-voltage accumulator beyond the target temperatures of the prior art in order to use the heat buffer created as a result during the journey to maintain the temperature of the high-voltage accumulator and the interior. Information about a charging stop at the end of the route can be used in order to reach the charging stop with a corresponding target temperature.

As an advantage of the invention, the energy consumption during the journey, in particular at low outside temperatures, can be reduced. A greater range and possibly a shorter travel time (due to shorter charging stops on account of optimized high-voltage accumulator temperatures) are possible. For example, for long-distance journeys in the winter which are planned by the vehicle user the evening before, potential is created by planning the corresponding preconditioning for the departure time.

Exemplary embodiments of the invention will be explained in more detail below with reference to the Figures.

BRIEF DESCRIPTION OF THE DRAWINGS

FIG. 4 shows the temperature profiles at the high-voltage accumulator and in the interior of an electric vehicle which are produced without preconditioning at low outside temperatures, and FIG. 5 shows the temperature profiles at the high-voltage accumulator and in the interior of an electric vehicle which are produced with preconditioning according to the prior art at low outside temperatures.

DETAILED DESCRIPTION OF THE DRAWINGS

Figure 1:
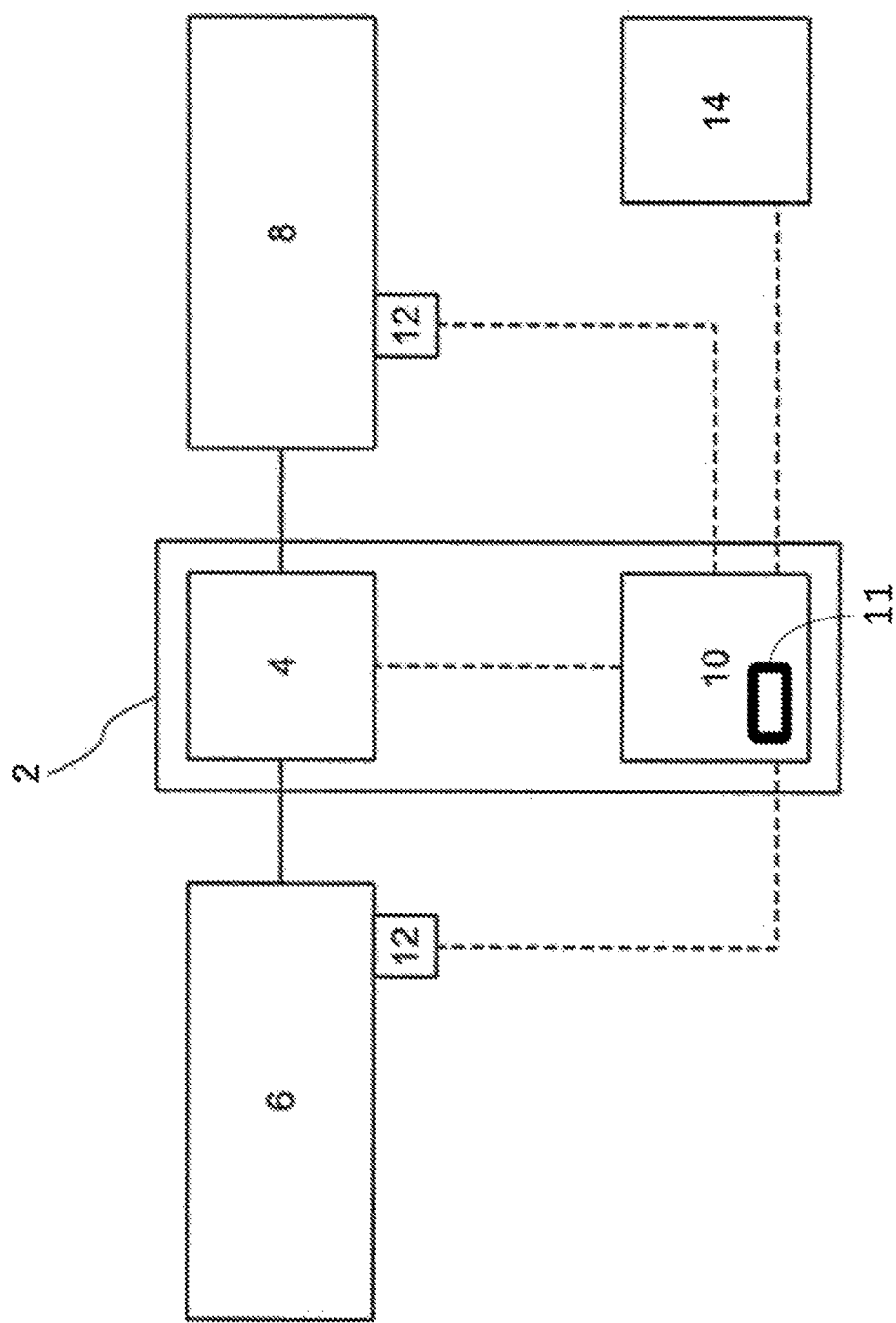
FIG. 1 shows a highly simplified illustration of a block diagram of the air-conditioning system according to at least one aspect of the invention.

FIG. 1 schematically shows a block diagram of an air-conditioning system 2 according to the invention. The air-conditioning system 2 has an air-conditioning installation 4 which is used to air-condition both a high-voltage accumulator 6 and an interior 8 of an electric or hybrid vehicle, not shown in any detail. The air-conditioning system 2 also has a control unit 10 which is connected to various components via control and signal lines, which are illustrated as dashed lines. For example, the control unit 10 activates the air-conditioning installation 4 and, in order to determine vehicle data, is also connected to sensors 12 in the interior 8 and on the high-voltage accumulator 6 and also to a navigation system 14. The control unit 10 has a preconditioning module 11, preferably in the form of a computer program product (software program), for implementing a preconditioning mode VOKO+ during charging of the parked vehicle before a journey begins t2.

Figure 2:
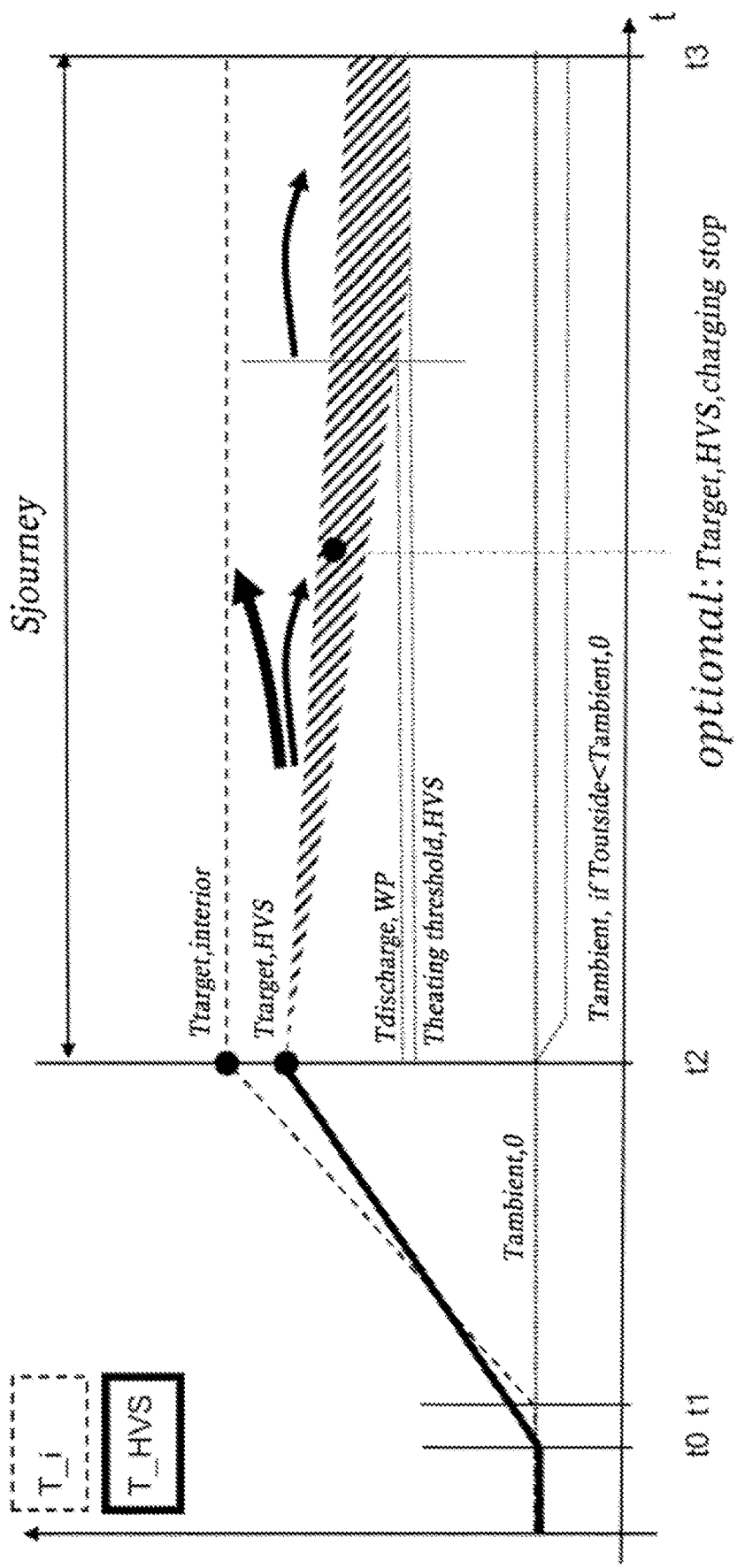
FIG. 2 shows the temperature profiles at the high-voltage accumulator and in the interior of the electric vehicle which are produced due to the preconditioning according to at least one aspect of the invention at low outside temperatures.

FIG. 2 shows profiles of the high-voltage accumulator temperature T_HVS and the interior temperature T_i over time t for an example for the preconditioning mode VOKO+ according to the invention in the case of heating at low outside temperatures $T_{outside}$. The profiles of the high-voltage accumulator target temperature $T_{target,HVS}$ specified according to the invention and the interior target temperature $T_{target,interior}$ are shown in particular. Furthermore, the heating threshold $T_{heatingthreshold,HVS}$, usually specified by the high-voltage accumulator controller, of the high-voltage accumulator 6, the discharge temperature $T_{discharge,WP}$ for the heat pump operation, the respectively current ambient temperature $T_{ambient}$ of the vehicle and the ambient temperature $T_{ambient,0}$ of the vehicle when a journey begins t2 or at the end of the preconditioning (e.g. in the garage) are plotted in the T-t graph.

The route $s_{journey}$ is defined by a journey beginning t2 and a journey ending t3. The vehicle is parked for charging purposes before a journey begins t2. The preconditioning mode VOKO+ according to the invention starts at time t0. Heating of the high-voltage accumulator 6 alone is preferably started at time t0 here. Heating of the interior 8 can start with a time delay at time t1. In this case, the outside temperature $T_{outside}$ is lower than the ambient temperature $T_{ambient,0}$ when a journey begins t2 and significantly lower than the heating threshold target temperature $T_{heating\ threshold,HVS}$ required by the invention, the high-voltage accumulator 6. Therefore, according to the invention, the high-voltage accumulator 6 is preferably used as a heat accumulator:

The air-conditioning system according to the invention is accordingly used to implement a preconditioning process or preconditioning mode VOKO+ during charging of the parked vehicle before a journey begins t2. In this case, the length of the route $s_{journey}$ and the outside temperature $T_{outside}$ over the length of the route $s_{journey}$ are initially predicted for the next journey and the high-voltage accumulator 6 is prepared as a heat accumulator depending on this prediction in such a way that subsequent heating of the high-voltage accumulator during the journey until a journey ends t3 is not required as far as possible. For this purpose, with activation of the preconditioning mode VOKO+, the high-voltage accumulator 6 is preferably heated to an elevated high-voltage accumulator target temperature $T_{target,HVS}$, which lies above the heating threshold target temperature $T_{threshold,HVS}$ required by the high-voltage accumulator 6, in such a way that the heat buffer created as a result can be used to keep the high-voltage accumulator temperature T_HVS above the heating threshold target temperature $T_{heating\ threshold,HVS}$ until a journey ends t3.

In other words, a corresponding high-voltage accumulator target temperature $T_{target,HVS}$ which is elevated in comparison to the heating threshold target temperature $T_{heating\ threshold,HVS}$ is determined and specified depending on the predicted length of the route $s_{journey}$ and the outside temperature $T_{outside}$ over the length of the route $s_{journey}$. This elevated high-voltage accumulator target temperature $T_{target,HVS}$ can be significantly higher in comparison to the known preconditioning with a high-voltage accumulator target temperature which has to ensure only that the heating threshold target temperature $T_{heating\ threshold,HVS}$ and the interior target temperature $T_{target,interior}$ required by the high-voltage accumulator 6 are reliably reached before a journey begins t2. This is clear from a comparison of FIG. 2 with FIG. 5. A yet greater difference appears upon comparison of FIG. 2 with FIG. 4 which shows the prior art without preconditioning.

In a development of the invention, the excess heat of the high-voltage accumulator 6 generated by the preconditioning mode VOKO+ according to the invention can also be used during the journey for heating the interior 8, at least until the high-voltage accumulator temperature T_HVS falls below the discharge temperature $T_{discharge,WP}$ for the heat pump operation.

If a charging stop is present when a journey ends t3, the discharge temperature $T_{discharge,WP}$ can be adjusted downward.

In principle, the preconditioning mode VOKO+ can additionally be implemented taking into consideration a planned charging stop, with information about a charging stop before or when a journey ends t3 being able to be used so that the charging stop can be reached with a specified charging target temperature $T_{target,HVS,charging\ stop}$.

The required energy during charging before a journey begins t2 for heating the interior 8 and the high-voltage accumulator 6 can preferably be drawn from the power grid or else existing heat sources in the vehicle (e.g. power control device, electrical flow heater or waste heat from the charging device for heating during the charging process).

Figure 3:
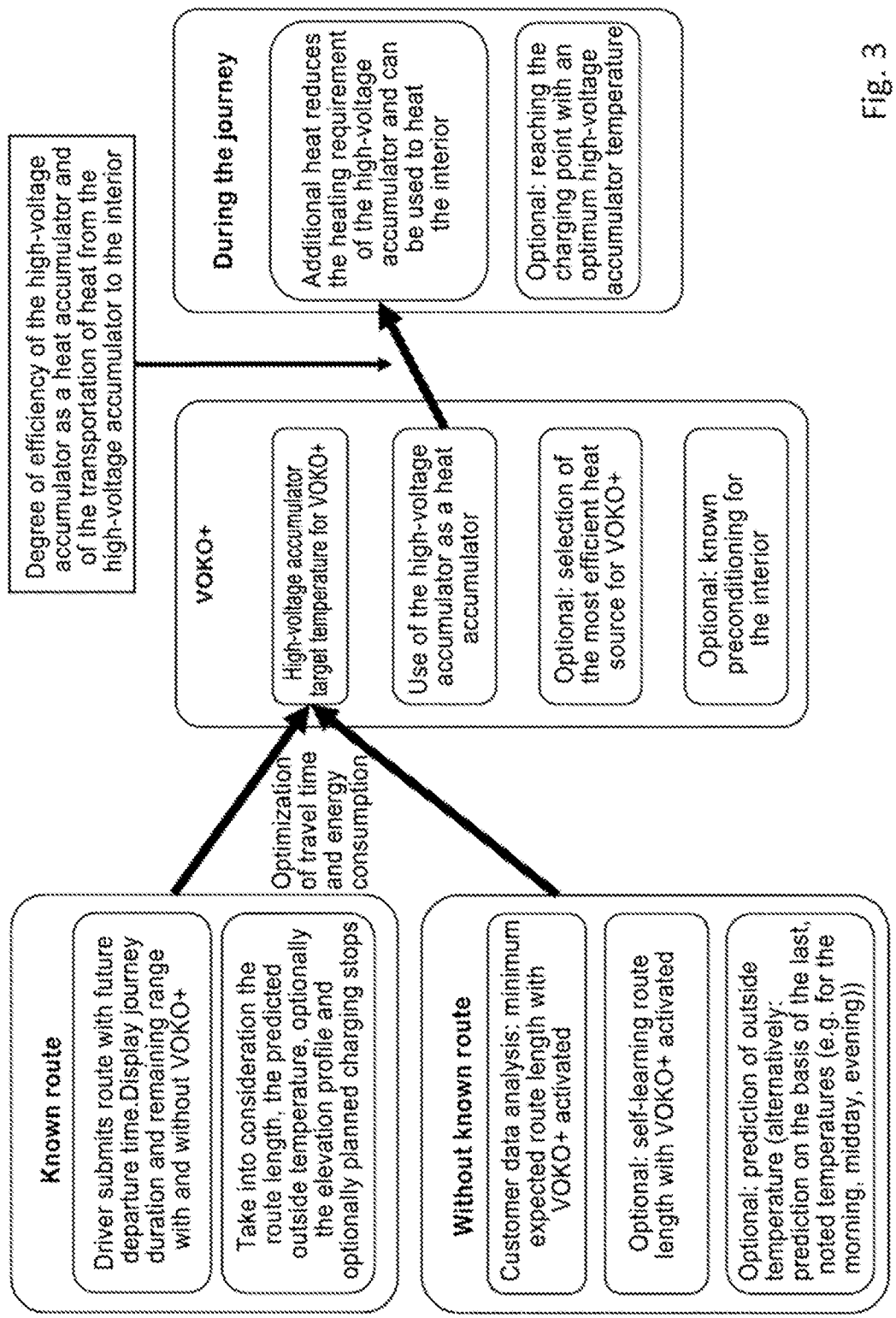
FIG. 3 shows an overview of the overall concept of the measures and effects according to at least one aspect of the invention.

FIG. 3 shows an exemplary overview of the overall concept of the preconditioning mode VOKO+ according to the invention.

The length of the route $s_{journey}$ and the outside temperature $T_{outside}$ for the length of the route $s_{journey}$ can be predicted both with ("known route") and also without ("without known route") input of a route destination in the navigation system 14 with activation of the preconditioning mode VOKO+.

Variant 1: Known Route
Determining a target temperature $T_{target,HVS}$ of the high-voltage accumulator for preconditioning for the departure time t2.

Variant 2: Unknown Route
Use of user data for determining a minimum route (and therefore minimum target temperature $T_{target,HVS}$ of the high-voltage accumulator).

Optimization variables may be energy consumption and travel time.

Therefore, without input of the route destination in a navigation system, an analysis of earlier defined vehicle usage data with activation of the preconditioning mode VOKO+ can be carried out.

For example, earlier defined and stored vehicle usage data can be analyzed for predicting a minimum expected route.

The invention claimed is:

1. An air-conditioning system for air-conditioning an electrified motor vehicle which has an interior and a high-voltage accumulator, the air-conditioning system comprising:
   an air-conditioning installation; and
   an electronic control unit,
   wherein the air-conditioning installation is configured to air-condition both the interior and the high-voltage accumulator, and
   wherein the control unit has a preconditioning module that implements a preconditioning mode during charging of the parked vehicle before a journey begins, wherein in the precondition mode:
   (a) the control unit is configured to predict at least: the length of the route and an outside temperature over the length of the route, and
   (b) the high-voltage accumulator is operated as:
      (i) a heat accumulator when the predicted outside temperature over the length of the route is lower than the heating threshold target temperature required by the high-voltage accumulator, and
      (ii) a cold accumulator when the predicted outside temperature over the length of the route is greater than the heating threshold target temperature required by the high-voltage accumulator.

2. The air-conditioning system according to claim 1, wherein, with activation of the preconditioning mode, either heating of the high-voltage accumulator to an elevated target temperature, which lies above the heating threshold target temperature required by the high-voltage accumulator, or cooling of the high-voltage accumulator to a reduced target temperature, which lies below the heating threshold target temperature required by the high-voltage accumulator, is provided in such a way that the heat buffer or cold buffer created as a result can be used to keep the high-voltage accumulator temperature above or below the heating threshold target temperature until a journey ends.

3. The air-conditioning system according to claim 1, wherein the length of the route and the outside temperature for the length of the route can be predicted both with and without input of a route destination in a navigation system with activation of the preconditioning mode.

4. The air-conditioning system according to claim 3, wherein the length of the route and the outside temperature for the length of the route can be predicted without input of the route destination in a navigation system by analyzing earlier defined vehicle usage data with activation of the preconditioning mode.

5. The air-conditioning system according to claim 4, wherein earlier defined and stored vehicle usage data can be analyzed for predicting a minimum expected route.

6. The air-conditioning system according to claim 1, characterized in that the preconditioning mode can additionally be implemented taking into consideration a planned charging stop, wherein information about a charging stop before or when a journey ends can be used so that the charging stop can be reached with a specified charging target temperature.

7. The air-conditioning system according to claim 1, wherein, with activation of the preconditioning mode, in the case of heating the elevated or in the case of cooling the reduced target temperature can be specified in such a way that not only is it ensured that the high-voltage accumulator temperature in the case of heating is kept above or in the case of cooling is kept below the heating threshold target temperature but also the interior temperature is kept at approximately the specified interior target temperature until a journey ends.

8. An electronic control unit for an air-conditioning system according to claim 1, comprising:
 the preconditioning module for implementing the preconditioning mode during charging of the parked vehicle before a journey begins.

9. A non-transitory storage medium having software instructions stored therein that, when executed by a processor, configure the processor as a preconditioning module for implementing the preconditioning mode for the electronic control unit of the air-conditioning system according to claim 1.

* * * * *